No. 633,303. Patented Sept. 19, 1899.
W. R. BLANCHARD, L. MATTHEWS & C. WATKINS.
LISTING MACHINE.
(Application filed Apr. 15, 1899.)
(No Model.) 2 Sheets—Sheet 1.
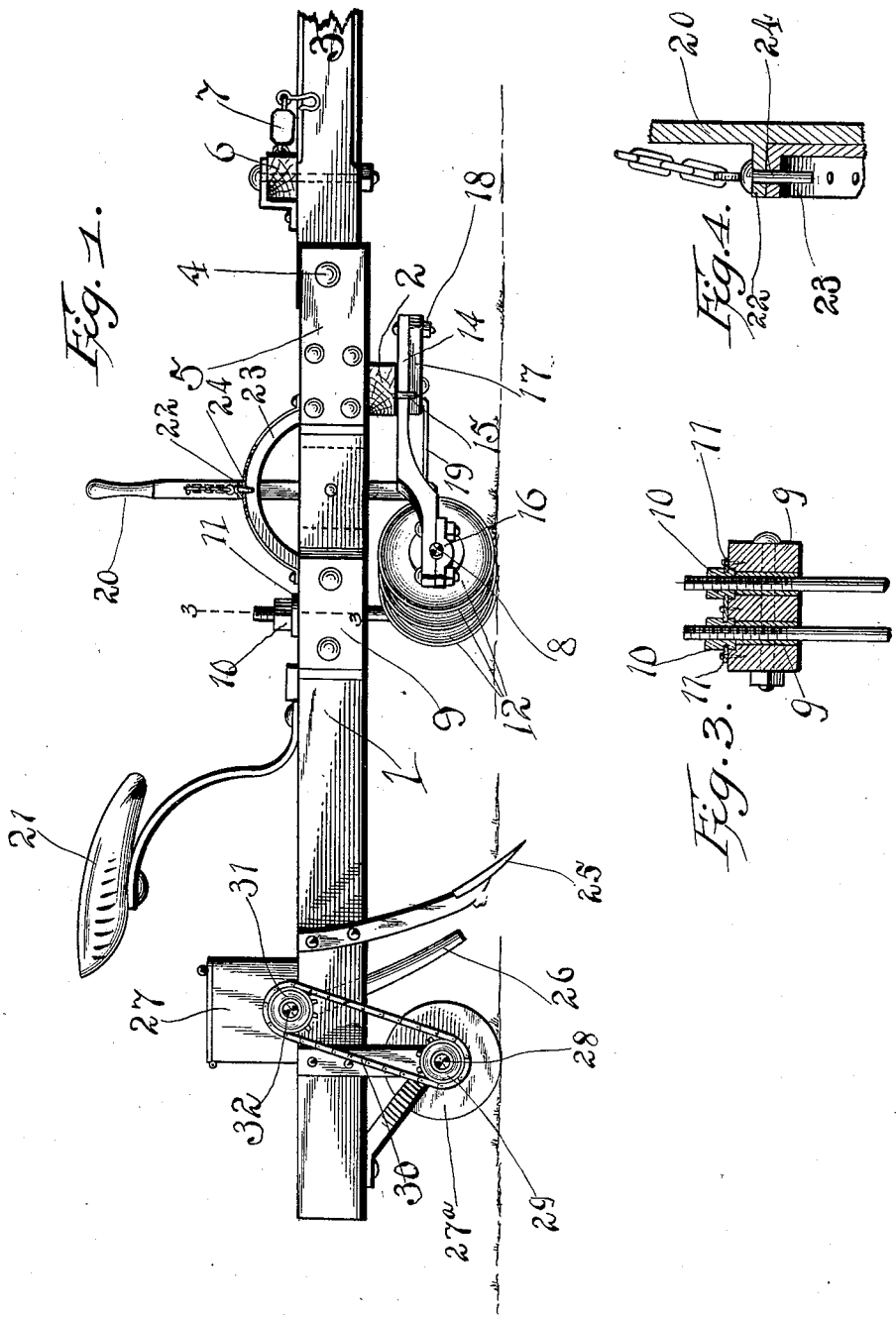
Witnesses
Inventors
William R. Blanchard,
Lafayette Matthews,
and Cisero Watkins.
by Frank S. Appleman Attorney

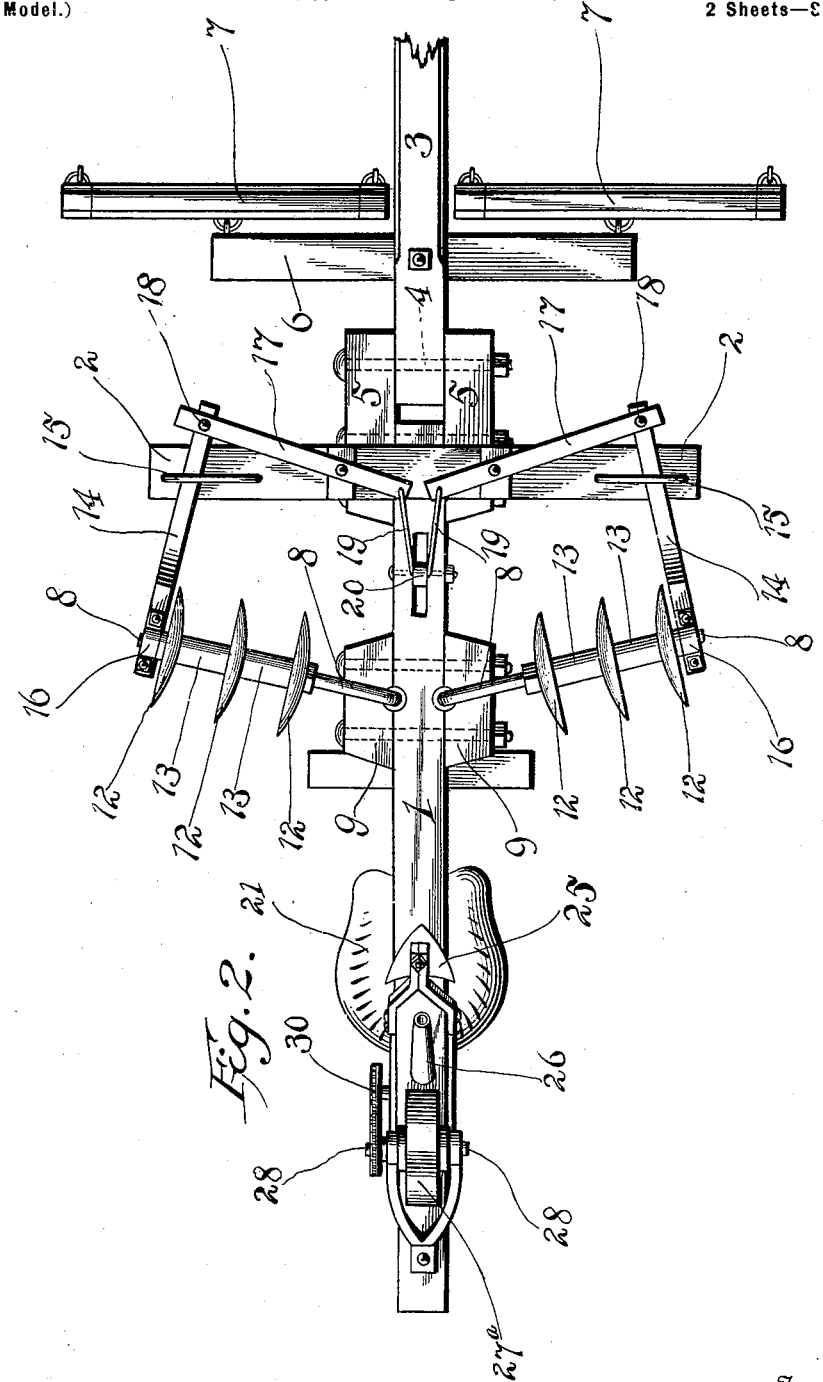

UNITED STATES PATENT OFFICE.

WILLIAM R. BLANCHARD, LAFAYETTE MATTHEWS, AND CISERO WATKINS, OF MERKEL, TEXAS.

LISTING-MACHINE.

SPECIFICATION forming part of Letters Patent No. 633,303, dated September 19, 1899.

Application filed April 15, 1899. Serial No. 713,156. (No model.)

*To all whom it may concern:*

Be it known that we, WILLIAM R. BLANCHARD, LAFAYETTE MATTHEWS, and CISERO WATKINS, citizens of the United States of America, residing at Merkel, in the county of Taylor and State of Texas, have invented certain new and useful Improvements in Listing-Machines, of which the following is a specification, reference being had therein to the accompanying drawings.

This invention relates to improvements in implements designed for the preparation of the soil, and it relates more particularly to that class of machinery used in connection with the formation of ridges for the reception of seed.

The object of the invention is to provide a novel implement for listing the soil from either side and in the provision of novel means for adjusting the angle of each series of disks.

Furthermore, the object of the invention is to provide novel means whereby the shaft carrying the disks may be set horizontally or on an incline that the listing action may be increased or diminished.

In connection with the invention it is also our purpose to supply a furrow-opener, a grain-chute, a grain-hopper, and a furrow-closing device of any ordinary construction for the purpose of working the ground and planting at a single operation.

Finally, the object of the invention is to produce a land-listing implement and seed-planter in which the parts are strong and durable, efficient and satisfactory in use, and comparatively inexpensive to produce and sustain.

With the above and other objects in view the invention consists in the details of construction; also, in the arrangement and combination of parts to be hereinafter more fully set forth and specifically claimed.

In describing the invention in detail reference will be had to the accompanying drawings, forming part of this specification, wherein like characters denote corresponding parts in the several views, in which—

Figure 1 is a side view of an implement embodying the invention. Fig. 2 is a bottom view thereof. Fig. 3 is a sectional view showing the ends of the adjustable shafts in elevation. Fig. 4 is a sectional view of the adjusting-lever and the segmental rack for retaining the lever.

In the drawings, 1 indicates the central beam, supporting near its front end a transverse bar 2. A tongue 3 is connected with the beam through the bolts 4 and parallel strips 5 5. The usual double and single trees 6 and 7, respectively, are also provided.

The listing device comprises in its construction a number of elements in duplicate—viz., shafts 8, having their inner ends bent up at approximately right angles and lying in recesses cut from the sides of the beam. The blocks 9 have recesses in their sides registering with the recesses of the beam, and said blocks embrace the extremities of the shaft in such a manner as to permit the ends to be adjusted vertically and freely rotate therein. The ends of the shaft are threaded, and adjusting-nuts 10 are run thereon. Retaining-plates 11 are secured to the upper surface of the beam, and the nuts are recessed to receive the plates, thus forming a swivel-point. By this arrangement the pitch or inclination of the horizontal portion of the shafts may be varied by turning the nuts to the desired degree, and by reason of the interlocking connection of the plates and nuts the parts will be held in their adjusted position. Each shaft is provided with a series of disks 12, suitably separated and held by collars 13. Arms 14 are slidable in guides 15 under the transverse bar, and bearings 16 are mounted on the rear ends for the reception of the outer ends of the shafts. The front ends of the arms are connected to levers 17, pivoted to the bolts 18. Links 19 connect the inner ends of the levers to a controlling-lever 20, projecting up within reach of the operator, who may be on the seat 21. This seat may be of any ordinary construction. The lever 20 is provided with an apertured flange 22, which rides over a segmental apertured rack 23, and a retaining-pin 24 is provided to engage the flanged rack for holding the lever in proper position. The shovel 25, grain-chute 26, and hopper 27 may be of any preferred form. The ground-wheel $27^a$ is mounted on a shaft 28, said shaft carrying a sprocket-wheel 29. A sprocketchain 30 operates over a sprocket-wheel 31 on the shaft 32 of the hopper. Thus the ground-wheel accomplishes two purposes—viz., it drives the feeding mechanism (not shown) of the hopper and it also closes the furrow after the seed has been deposited. Through the mechanism shown the operating-lever controls the angle of the disks, and the degree of the angle will determine the height of the ridges. As the manner in which this is accomplished will be apparent to one familiar with the art, it is thought unnecessary to describe the operation of each element of the combination in detail. As an additional means for regulating the height of the ridge we have provided the adjustable shaft heretofore described.

The construction, operation, and advantages will, it is thought, be understood from the foregoing description, it being noted that various changes in the proportions and other details of construction may be made without departing from the spirit of the invention.

Having thus fully described our invention, what we claim as new, and desire to secure by Letters Patent, is—

1. In a listing-machine, a central beam adapted to support a transverse bar, said beam having recesses in its sides, shafts having upturned ends lying in the recesses, blocks having recesses registering with the recesses of the beam, means for securing the blocks in place, disks on the shafts, and nuts on the ends of the shafts for vertically adjusting the same, means for holding the ends of the shafts in their vertically-adjusted position and a lever pivoted through the beam adapted to control the angle of the said disks, substantially as described.

2. In combination with a listing-machine, a central beam, a transverse bar thereon, said beam having recesses in its sides, shafts having upturned ends lying in the recesses, blocks having recesses registering with the recesses of the beam, means for securing the blocks in place, disks on the shafts, and nuts on the ends of the shafts for vertically adjusting the same, means for holding the ends of the shafts in their vertically-adjusted position, a controlling-lever pivoted through the beam, adapted by means of levers and links to vary the angle of the disks, substantially as described.

3. In combination with a listing-machine, a central beam having a transverse bar thereon, guides on the under side of said bar, arms operating through said guides, bearings on the rear ends of said arms adapted to receive the ends of the shafts, the beam having recesses in its sides, shafts having upturned ends lying in the recesses, blocks having recesses registering with the recesses of the beam, disks on the shafts, retaining-plates having recessed nuts, and a controlling-lever pivoted through the beam connected to the levers by means of links, said levers being connected to the front end of the arms, substantially as described.

4. In a listing-machine, a central beam and a transverse bar, guides on the under side of the said bar, arms operating in the guides, said arms having their front ends pivoted to levers, bearings on their rear ends, the said beam having recesses in its sides, shafts having upturned ends lying in the recesses with their outer ends in the bearings, disks on the shafts, blocks having recesses registering the recesses of the beam, retaining-plates, recessed nuts, and a controlling-lever pivoted through the beam having an apertured flange riding over a segmental rack and a pin adapted to engage the flanged rack for holding the lever in position, substantially as described.

In testimony whereof we affix our signatures in the presence of two witnesses.

WILLIAM R. BLANCHARD.
LAFAYETTE MATTHEWS.
CISERO WATKINS.

Witnesses:
J. J. MILLER,
A. A. BAKER.